United States Patent [19]

Rees et al.

[11] 4,032,357

[45] June 28, 1977

[54] EASY DISPERSING ALKALI BLUE POWDER AND PROCESS FOR MANUFACTURE

[75] Inventors: Thomas C. Rees, Park Forest South; Robert J. Flores, Alsip, both of Ill.

[73] Assignee: The Sherwin-Williams Company, Cleveland, Ohio

[22] Filed: Mar. 3, 1976

[21] Appl. No.: 663,600

[52] U.S. Cl. .................. 106/288 Q; 106/308 Q; 106/241; 106/253; 106/266; 106/308 M; 106/309; 106/308 F

[51] Int. Cl.$^2$ ..................................... C08K 5/17

[58] Field of Search ............ 106/288 Q, 266, 253, 106/241, 308 M, 308 F, 309

[56] References Cited

UNITED STATES PATENTS

| | | | |
|---|---|---|---|
| 3,582,381 | 6/1971 | Papenfuss et al. | 106/288 Q |
| 3,635,745 | 1/1972 | Rentel et al. | 106/288 Q |
| 3,712,824 | 1/1973 | Keyokawa et al. | 106/309 |
| 3,925,094 | 12/1975 | Papenfuss et al. | 106/288 Q |

*Primary Examiner*—Patrick P. Garvin
*Assistant Examiner*—J. V. Howard
*Attorney, Agent, or Firm*—Richard G. Smith; James V. Tura; Neil A. DuChez

[57] ABSTRACT

An easy dispersing alkali blue type pigment product and a process for making the same is provided which retains the color strength per unit alkali blue present of a flushed color product, but which contains less oil phase than a flushed color and is a free-flowing powder. The pigment can be very easily dispersed in oleoresinous systems such as printing inks, paints, plastics and the like to develop an outstanding fineness of grind and substantially full color strength.

The pigmentary product of this invention is free-flowing and contains at least about 50% by weight of alkali blue pigment solids, and preferably more, coprecipitated with at least one organic dispersant of the anionic class containing at least eight carbon atoms, said dispersant is soluble in aqueous alkaline solutions and precipitated therefrom upon acidification. The coprecipitated pigment and dispersant particles are fixed at spaced apart magnitudes by means of a quantity but not in excess of about 45% by weight of the pigment solids by means of a viscid water insoluble organic hydrophobic oil phase.

The product is produced by forming an aqueous solution in alkaline medium of the defined dispersant and the alkali blue pigment, coprecipitating the two components by acidification. Before drying the coprecipitate, but either before or after adding an amount but not in excess of about 45% by weight of the pigmentary solids of a varnish-like hydrophobic oil phase thereto, the water-containing mass is subject to a heat treatment step at a temperature of from about 60° C to about 120° C, the time of heating varying somewhat with the nature of the selected dispersants, but less than 60 minutes if the selected temperature is about 100° C. The heat treatment enhances the strength, color and degree of dispersion of the pigmentary product.

17 Claims, No Drawings

EASY DISPERSING ALKALI BLUE POWDER AND PROCESS FOR MANUFACTURE

This invention relates to an improved alkali blue pigment dispersion in a substantially dry form characterized by its ease of further dispersion in organic binder vehicles for a wide variety of end uses including paints, printing inks, plastics, carbon paper, etc., where the highly efficient use of the colorant is material to the final product cost.

The term "alkali blue" is generally known in the art and it is hereby defined and used herein to mean and include a sulfonated phenylated rosaniline or para rosaniline of the general structure:

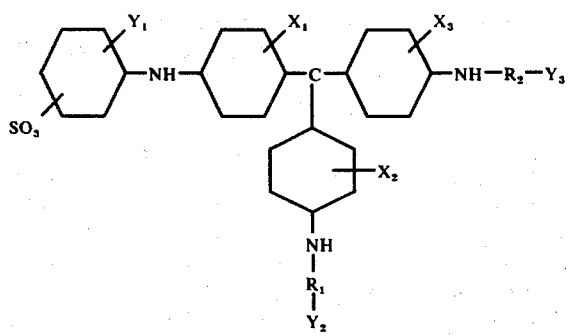

where $R_1$ and $R_2$ are phenyl or hydrogen, $X_1$, $X_2$, $X_3$ and $Y_1$ are hydrogen or alkyl groups less than 4 carbons, and $Y_2$ and $Y_3$ are hydrogen or alkyl groups of 1 to 4 carbons when $R_1$ and $R_2$ respectively are phenyl. In the usual commercial form and as more specifically used herein in the examples for illustrative purposes $X_1$, $X_2$, $X_3$ and $Y_1$ are hydrogen and $Y_2$ and $Y_3$ are hydrogen or phenyl. Another form of considerable interest embraces the alkali blue product where $Y_1$, $Y_2$ and $Y_3$ are hydrogen or methyl.

Whenever the water-wet slurry or presscake of an organic pigment is dried, the individual particles therein become cemented tightly together into large, hard agglomerates. This material then has little color value and must be redispersed. The amount of dispersion work required depends on the particular pigment being used, and on treatments the pigment has been given prior to drying. Alkali blue, due probably to the polarity of the pigment the hydrophillic groups in the molecule, its internal salt structure, opportunity for hydrogen bonding to the surface, and also its extremely small primary particle size, (about 100 Angstrom units diameter), tends to agglomerate more severely than most pigments and is extremely difficult to redisperse.

Alkali blue is notorious as a hard textures pigments, difficult to disperse in liquid carrier vehicles. For this reason, alkali blue has been used in commerce principally as a flushed color. In the flush color art, the struck pigment in its primal state in an aqueous carrier phase is transferred from a water-wet to an oil-wet product, never passing through a drying operation where agglomeration of the originally highly dispersed primal pigmentary particles occurs, making subsequent dispersion to a similar state of subdivision practically impossible to achieve. This agglomeration or cementing of particles is sometimes referred to as hydrophilic aggregation. Under the best conditions about 20% of the color value or color strength is lost in producing a dry alkali blue pigment as compared with flush color alkali blue.

Flush colors are not a total answer, however, for the amount of pigment present is of the order of 40% by weight of the total and the inkmaker, for example, is limited by the nature of the 60% vehicle present in the flush color in producing color strength, viscosity and tack as well as the compatibility with other ink vehicles for a variety of end uses. Not only is the quality of the vehicle fixed, but its quantity as well. There is a solid demand, but no satisfactory supply of a substantially dry, free-flowing, non-cohesive alkali blue "powder" meeting the many commercial requirements of the day, particularly easy dispersibility.

"Easy Dispersing" is herein defined as meaning the dry dispersing product can be dispersed to a satisfactory grind with one pass through a three-roll mill (following a suitable premix operation), meanwhile developing color strength substantially equal to or greater than that of a flushing of the same pigment at the same true pigment content. In the most important application of alkali blue — that of toning black inks — easy dispersing would mean that the color disperses equal to or better than a good quality dry carbon black, to give substantially the same or better toning value as a flushing of the same pigment at the same true pigment content.

It is an object of the present invention to provide an easy-dispersing alkali blue dry color which can be satisfactorily dispersed in oleoresinous or organic solvent based ink systems to give a product having color strength, grind and other pigmentary properties substantially equal to or better than a similar product made from a flushing of the same pigment at the same true pigment content.

It is another object of the present invention to provide an easy-dispersing alkali blue dry color which can be dispersed in oleoresinous or organic solvent based ink systems along with carbon black pigment, using no more dispersion work than would be necessary to disperse the carbon black alone, to give a black ink of substantially equivalent or better jetness, grind and other color properties to a black ink toned with a flushing of the same pigment at the same true pigment content.

It is another object of the present invention to provide an easy-dispersing alkali blue dry color which can be very easily dispersed into a carbon paper ink to be used either alone or as a toner for iron blue or carbon black pigments and which has substantially equivalent or better color value and other color properties as a carbon paper ink made from a flushing of the same pigment at the same true pigment content.

The improved dry alkali blue pigment of this invention is characterized by ease of dispersion and is produced by dissolving the freshly precipitated and washed dyestuff in the acid state in an aqueous alkaline bath to form a solution.

To this solution is illustratively added from about 5 to 20% of the dye product solids in solution of one or more organic dispersant acids as the alkali soap or salt of a class whose acid form is insoluble in water. These acids are preferably ones which are dispersants for the pigment while in the anionic neutralized forms, containing eight or more carbon atoms in the dispersant structure. Superior results appear to be achieved with some acids when they are blended with surfactants or dispersants which are esters of phosphoric acid with polyoxyethylene alcohols such as those sold by GAF Corp. under the trademark "GAFAC." Examples of these acids are rosin acids and modified rosin acids, and Turkey Red Oil. Other acids, for example, Armeen Z (an N-substituted amino acid manufactured by Armak Corp.), function equally well with or without the GAFAC.

After all of the components are in solution, the dissolved dye solids and organic dispersants are coprecipitated (or struck) together by admixture with a mineral acid. While the precipitated primal pigmentary particles can be filtered and washed before proceeding, good quality products can be produced by adding directly to the freshly precipitated alkali blue pigment and dispersants a quantity of a water-insoluble hydrophobic oil phase, usually having a viscid quality.

The selection of the hydrophobe oil phase to be added is primarily dependent upon the end use. Most often the viscid hydrophobic oil phase is in the nature of a varnish, either natural oils and resins or of synthetic quality. When a natural varnish the resin phase may be rosin, rosin ester, hydrogenated rosin, drying or semi-drying oil, etc. When a synthetic resin, the resin may be an alkyd, coumarone-indene, phenolic, hydrocarbon, acrylic, etc. and may also be extended or modified with a saturated or unsaturated drying or semi-drying or non-drying oil. Often the hydrophobic oil phase may be a mineral oil of a selected viscosity range. The resin or oil may also be extended with a non-volatile organic solvent. Physically, the hydrophobic oil phase is a liquid at 100° C, substantially soluble in the system in which the color is going to be used, substantially insoluble in water and non-volatile. While some hydrophobes as generally illustrated above are preferred over others, the preference and selection thereof is related to the final end use of the ultimate alkali blue containing composition. The exact nature of the hydrophobe oil phase is not particularly critical to its main purpose and function in this invention, which is, namely to act as a carrier for the alkali blue pigment particles, keeping them apart during water removal during manufacture, shipment and storage so that natural forces cannot cause objectionable aggregation of the primal disperse state of the individual pigmentary particles originally obtained upon being freshly precipitated by acidification out of their aqueous alkaline solution and upon removal of water.

The amount of the hydrophobic oil phase will vary in amount from about 2% to about 45% by weight of the alkali blue pigmentary product. At the upper end of the range, obviously less color is obtained in the concentrate and the freedom of compounding is more limited.

If the dispersant organic acid coprecipitants are used at higher levels, then the amount of hydrophobic oil phase can generally be reduced, thus increasing the strength of the dry color end product. However, if too much dispersant is used, above about 20% based on the weight of the total product, ink properties may be adversely affected. The examples which follow illustrate sufficient variation so that one familiar with the art can modify and select qualities and quantities of hydrophobic oil phase to meet specific formulating problems for a given end use. Care should be exercised that the amount of hydrophobic oil phase is not sufficient to produce a cohesive, non-flowing end product, defeating major objectives.

The useful dispersant organic acids that are coprecipitated with the alkali blue pigment upon acidification, as referred to above, can be defined broadly by the following characteristics: They must be soluble in aqueous alkali, but not decomposed by it, insoluble in water or dilute mineral acids, non-reactive with the pigment and substantially non-volatile. Preferably, they are dispersants for the pigment in their neutralized anionic forms. They can belong either to the purely natural type of surfactant or dispersant class, such as aliphatic fatty acids of from about eight to twenty-two carbon atoms in length or rosin acids, or to modified versions of these or other natural oils or acids, such as sulfated castor (vegetable) oil (Turkey Red Oil), sulfonated fatty acids and diacids or modified rosin acids such as hydrogenated rosin, dimerized or polymerized rosin and rosin esters, subjected to the restriction that their acid numbers be high enough to allow solution in aqueous alkali. Another broad category of organic acids suitable for the present invention are the synthetic types, one particularly useful examples being the N-substituted amino acid, exemplified by Armeen Z. Another very useful class are the esters of phosphoric acid with polyoxyethylene alcohols exemplified by the Gafacs. It should be noted here that these phosphoric acid esters are decomposed by mineral acids, probably to the free polyoxyethylene alcohols and phosphoric acid. This does not affect their function as coprecipitants in the invention. In fact, we have found that substituting a free polyoxyethylene alcohol itself for the Gafac by emulsifying it into the aqueous alkali solution of the pigment or into the mineral acid prior to precipitation does not produce the same effect on the dispersibility of the product as does the Gafac ester. The coprecipitation components must be soluble in the alkaline pigment solution prior to precipitation.

Returning to the alkali blue precipitate described above, there is presented a finely-divided pigment, intimately mixed with one or more organic acids or the acid-hydrolyzed residue of said acids which have been coprecipitated with the pigment, said coprecipitate still water wetted by the original aqueous phase, now acid rather than alkaline in pH. The water insoluble organic hydrophobic oil phase is added and mixed in rapidly and vigorously with the aqueous slurry, so as to further disperse the pigment particles in the hydrophobe oil phase.

The aqueous pigment containing slurry is next subjected to a heat treating period of duration and temperature in part dependant upon the selection of the organic acid or acids added as pigment dispersants as above. The heat treatment may be carried out, however, either before or after the introduction of the hydrophobic oil phase, so long as the water present has not been removed.

The heat treatment improves the quality of the final colorant. What happens during the heat treating period is not fully known. Electron microscope photographs of samples removed at various times during the heat treatment show a progressive "rounding off" of the sharp corners or points of the individual alkali blue crystallites.

These "points" are believed to be the points at which the crystals would otherwise stick together on drying. Indeed, this kind of aggregation is observed under the electron microscope. Rounding off the corners should not only reduce this tendency to aggregate, but may also assist in more complete coating of the pigment particle by the hydrophobic oil phase, since such corners and edges should present the greatest obstacle to an advancing contact angle.

It is believed that the principal function of the precipitated organic dispersant acid in the invention is to sensitize the pigment particles to heat. Evaluation of samples withdrawn periodically during the heat treatment and dried demonstrates that alkali blue pigment treated with one or more of the organic acids described above with or without the added hydrophobic oil phase, increases in color strength much more rapidly, and to a higher maximum strength, than alkali blue pigment not so treated. Similarly, the pigment treated with one or more of the dispersant organic acids increases in ease of dispersion much more rapidly during heating and reaches a much greater maximum ease of dispersion than the pigment not treated. A further function of the coprecipitated organic acid may be to act as a dispersant at the time of formation of the crystals, but we do not wish to be bound by theory.

Electron microscope studies show additionally that the alkali blue crystallites have a tendency to form layers on extended heating (beyond that necessary for optimum color development) and a resultant reduction in surface area is observed by nitrogen adsorption measurements. This may account for the fall-off in color strength often observed on extended heating and demonstrates the best practice to be to tailor the heat treatment time to the particular organic acid used. Finally, optical microscope studies show the individual pigment aggregates to become smaller and smaller with continued heat treatment, until all but a very few are at the limit of resolution of the optical microscope in size.

It is believed that the function of the hydrophobic oil phase is to prevent usual aggregation of the pigment particles during drying by replacing a relatively high energy pigment-water interface with relatively low energy pigment-oil interface, and by preventing the particles from approaching one another close enough for intermolecular forces such as Van der Waals forces and hydrogen bonding to become effective in binding them together.

Combination of the two treatments — the dispersant organic acid coprecipitation and the hydrophobic oil coating, seems to produce a synergistic and greater effect than either treatment used alone. As pointed out above, the rounding off of pigment crystal corners produced by heating, which is accelerated by inclusion of an organic acid in the coprecipitation step, may facilitate coating of the pigment by the oil phase, and this may account for the synergistic effect observed. The effect is not produced by simple dissolution of the organic dispersant in the oil phase, as oil-insoluble organic dispersants have been found to work as well in some instances.

It has been demonstrated that a pigment coprecipitated with a combination of dispersant organic acids as described above but not coated with a hydrophobic oil phase is of considerably poorer dispersibility and strength that one prepared in full according to the present invention. Similarly, a pigment not coprecipitated with an organic acid but treated with a hydrophobic oil phase is also of considerably poorer dispersibility than one prepared as disclosed herein. Neither of these above noted pigments would be considered "easy dispersing" as the term is intended in this disclosure.

The heat treatment normally consists of heating the precipitated pigment in aqueous slurry, before or after addition of the hydrophobic oil phase and before or after filration to concentrate the slurry, (but before drying) to a temperature of between 60° to 120° C for a period of between 0 to 90 minutes starting from the time the slurry arrives at the stated temperature. Preferably, the temperature is between 70° and 100° C and the time between 5 and 60 minutes. At the end of the heat treating period, the temperature is reduced below the heat treating level by flooding with cooling water or by other suitable means. Preferably, the periods during which the temperature is being raised to the desired level and during which it is being lowered are made as short as possible.

Subsequent to the heat treatment, any type of drying equipment may be adapted to the removal of the water remaining. Normally, about 0.5 to 5.0% of water based on the total weight of the final pigment product remains associated with the particles, but this is not in itself critical, except from the standpoint of end use. Spray drying eliminates the need for a subsequent pulverizing step and is preferred.

The following examples are illustrative of a variety of procedures used in the practice of this invention. In the examples all parts are by weight and all temperatures are in degrees Centrigrade, unless otherwise specified.

EXAMPLE 1

571 parts of a 35% aqueous presscake of alkali blue (200 parts dyestuff) consisting principally of triphenyl-pararosanilinemonosulfonic acid is stirred with 600 parts water and 29.4 parts sodium hydroxide. The slurry is heated to 100°, held there until the blue color has disappeared to form a reddish brown solution, and flooded with water to 75°. At this point the following materials are added:

| | |
|---|---|
| 14.7 parts Turkey Red Oil (100% active) | |
| 7.5 parts Gafac RS-610[1] | Mixture "A" |

[1]A diester of a substituted polyoxyethylated alcohol and phosphoric acid made by GAF Company.

The solution is stirred 10 minutes and then run into a solution of 28.2 parts hydrochloric acid (as 100%) in 850 parts water to precipitate the color. To the struck slurry is now added 41.1 parts of an oleoresinous vehicle having the following composition:

| | |
|---|---|
| 88.0% naphthenic mineral oil | |
| 10.0% synthetic Copal resin | Mixture "B" |
| 2.0% soya oil modified phthalic alkyd | (long oil) |

The slurry is stirred 15 minutes, heated to 95° over a 22 minute period, held at 95° for 4 minutes and flooded to 65° with water. The slurry is filtered, washed free of salts, and dried at 70° for 24 hours. There are obtained 250 parts of an intense blue pigment with an alkali blue content of 76% which can be very easily dispersed into an ink to give the properties described in Table I below.

EXAMPLE 2

Example 1 is repeated except that Mixture A consists of 14.7 parts water white wood rosin and 7.5 parts Gafac RS-610, and the slurry is heated to 95° over 14 minutes and held at 95° for 18 minutes. Yield is 256 parts of a pigment which is 76% alkali blue and which can be very easily incorporated into an ink with the results show in Table I.

EXAMPLE 3

Example 1 is repeated except that Mixture A consists of 22.2 parts Armeen Z[2] and the slurry is heated to 95° over 13 minutes and held at 95° for 7 minutes. There are obtained 253 parts of a pigment which is 76% alkali blue which can be very easily dispersed into an ink with the results shown in Table I.

[2]A N-substituted amino acid from Armak & Co.

EXAMPLE 4

This example demonstrates the use of a coprecipitant which is insoluble in the oleoresinous vehicle used in Mixture B.

Example 1 is repeated except that Mixture A consists of 7.5 parts Gafac RS-610 and 14.7 parts Unirez 7730-D[3], and the slurry is heated to 95° over 20 minutes and held at 95° for 20 minutes. There are obtained 249 parts of a pigment which is 76% alkali blue and which can be very easily dispersed into an ink with the results given in Table I.

[3]A modified rosin manufactured by Union Camp Corp.

EXAMPLE 5

Example 1 is repeated except that Mixture A consists of 22.2 parts Turkey Red Oil (100% active) and the slurry is heated to 95° over 18 minutes and held there 11 minutes. Yield is 252 parts of 76% pigment, results are in Table I.

EXAMPLE 6

Example 1 is repeated except that Mixture A consists of 22.2 parts Gafac RS-610 and the slurry is heated to 95° over 12 minutes and held there 14 minutes. Yield is 250 parts of 76% pigment, results are in Table I.

EXAMPLE 7

This example illustrates the use of a coprecipitant not known to be a dispersing agent for the pigment.

Example 1 is repeated except that Mixture A consists of 22.2 parts 2-naphthoic acid and the slurry is heated to 95° over 18 minutes and held there 26 minutes. Yield is 254 parts of a 76% pigment which disperses easily in an ink to give a good grind but poor strength. Results are in Table I.

EXAMPLE 8

Example 1 is repeated except that Mixture A consists of 7.5 parts Gafac RS-710[4] and 14.7 parts Armeen Z, and the slurry is heated to 95° over 10 minutes and held at 95° for 15 minutes. Yield is 255 parts of 76% pigment, results are in Table I.

[4]GAF Company product similar to GAFAC RS-610.

EXAMPLE 9

This example illustrates the use of a non-ionic surfactant known to be a dispersing aid for alkali blue, but which is not solubilized by aqueous sodium hydroxide and cannot be coprecipitated in an acid form.

Example 1 is repeated except that Mixture A consists of 22.2 parts Igepal CO-630[5] (a polyoxyethylene alcohol type surfactant), and the slurry is heated to 95° over 14 minutes and held there 8 minutes. Yield is 251 parts of a 76% pigment which can be dispersed fairly easily into an ink but has a relatively poorer grind. Results are in Table I.

[5]A surfactant from GAF Company.

EXAMPLE 10

Example 1 is repeated except that Mixture B consists of 67.7 parts of a mixture of 50% Copal resin and 50% 535° oil (heating times and Mixture A being identical). Yield is 268 parts of a 69% pigment. Results are in Table I.

EXAMPLE 11

Example 1 is repeated except that Mixture B consists of 67.7 parts of a 100% linseed modified alkyd[6] having low viscosity (600 cps). Yield is 279 parts of a 69% pigment. Results are in Table I.

[6]Sold as Solvar by Lawter Chemical Company.

EXAMPLE 12

Example 1 is repeated except that Mixture B consists of 60.9 parts Solvar and 6.7 parts synthetic Copal resin. Yield is 277 parts of a 69% pigment. Results are in Table I.

EXAMPLE 13

Example 1 is repeated except that Mixture B consists of 33.8 parts Neville LS-1035[7] hydrocarbon resin and 33.8 parts 600° oil. Yield is 273 parts of a 69% pigment. Results are in Table I.

[7]A coumarone-indene resin manufactured by Neville Chemical Company.

EXAMPLE 14

Example 1 is repeated except that Mixture B consists of 41.1 parts of a mixture of tall oil and rosin acids (Unitol R[8]). Yield is 252 parts of a 76% pigment. Results are in Table I.

[8]"Unitol R" product of Union Camp Company.

EXAMPLE 15

Example 1 is repeated except that Mixture B consists of only 21.7 parts of the oleoresinous vehicle described. Yield is 238 parts of an 82% pigment. Results are in Table I.

EXAMPLE 16

This example illustrates the use of an insufficient amount of coprecipitant.

Example 1 is repeated except that Mixture A is only 7.3 parts Gafac RS-610 and Mixture B is 52.4 parts of a mixture of 50% Copal resin and 50% 535° oil. There is obtained 240 parts of a 77% pigment which is moderately easy to disperse in ink. Results are in Table I.

EXAMPLE 17

Example 1 is repeated except for the following: The struck slurry is heated to 95° over 4 minutes before adding Mixture B, which also contains 3.0 parts of octadecylamine acetate. 41.1 parts of Mixture B are added. Total time at 95° is 17 minutes. There are obtained 253 parts of a 76% pigment which disperses extremely easily in an ink vehicle to give the results shown in Table I.

EXAMPLE 18

This example illustrates the effect of the oleoresinous vehicle.

Fifteen hundred parts dry basis of crude alkali blue sulfonic acid as a presscake with 3500 parts water are charged to an agitated tank together with 4000 parts water and 200 parts sodium hydroxide. The slurry is heated to boiling and cooled to 75°. At this point 55 parts Gafac RS-610 and 105 parts water-white wood rosin, pre-dissolved in aqueous sodium hydroxide are added. The amber solution is now run into a solution of 800 parts 31% aqueous hydrochloric acid and 6000 parts water. After a short stirring period the batch is divided into two equal parts.

Part A is treated with 150 parts of the oleoresinous vehicle described in Example 1, heated to 90° over 30 minutes, held there 15 minutes, flooded to 70°, filtered, and spray dried. There is obtained an intense blue pigment, which is 71% alkali blue. It is easily incorporated into an ink using a premix operation and two passes over a three-roll mill to give a color 2% weak compared to an ink made from a flushed color with a NPIRI grind of 0/0/0. Even after only one pass, the grind is 0/0/10 light. (See following Example 20 for an explanation of the NPIRI readings.)

Part B is not treated with oleoresinous vehicle but simply heated to 90° over 30 minutes, held there 20 minutes, flooded to 70°, filtered, washed and spray dried. The product is a 90% pigment which can be incorporated into an ink with a premix operation and three passes to give an ink 10% weak to an ink made from a standard flushing at equal true pigmentation with a NPIRI grind of 0/0/10 light. If only two passes are used, the NPIRI grind has a very heavy particle field.

EXAMPLE 19

Five hundred grams dry basis (1315 g presscake) of crude alkali blue (sulfonic acid form) are slurried with 2500 g water and 68.5 g sodium hydroxide. These are heated to boiling. After 10 minutes a solution of 39.3 g rosin, 19.2 g Gafac RS-610 and 15.0 sodium hydroxide in 200 g water are added. The amber colored alkali blue solution is cooled to 80° and then pumped continuously into a one-liter reaction vessel at a rate of 36 cc/minute. Simultaneously, a 5.2% HCl solution and tap water are run into the vessel at 19.5 and 50 cc/minute respectively. Rapid stirring is maintained throughout. Other strike parameters are as follows:

| | |
|---|---|
| Residence Time: | 6.6 min. |
| Residence Volume: | 700 cc |
| Temperature: | 39.5 ± 0.5° |
| pH: | 1.31 ± 0.01 |

All values are taken after a total equilibration period of 5 residence times (33.0 minutes). The effluent from this strike is then pumped directly through a preheater which raises its temperature to 74°. Following this, "Solvar" alkyd is fed into the slurry stream at 100g/minute. This mixture is then pumped into a heat treatment tank equipped with an efficient stirrer. After equilibration for 5 residence times the parameters are as follows:

| | |
|---|---|
| Residence Time: | 20 minutes |
| Residence Volume: | 2100 cc |
| Temperature: | 94.5 ± 0.5° |

The effluent from the heat treatment vessel is immediately mixed with a stream of water which lowered its temperature to 67 ± 3°, and collected in a tank. After the run, the slurry is filtered on a Buchner funnel, (the slurry obtained during the equilibration period is discarded) washed free of salts, and dried overnight at 70°. A total of 175g of intense blue pigment having an alkali blue content of 72.6% is obtained which can be very easily dispersed in an ink vehicle to give the results listed in Table I.

EXAMPLE 20

Example 1 is repeated except that the dyestuff consists of 600 parts of a 33% aqueous presscake of alkali blue in which a portion of the outer phenyl rings are substituted with a methyl group by substituting a portion of the aniline with toluidines in its manufacture (200 parts dyestuff), and Mixture A consists of 14.7 parts of water, white wood rosin and 7.5 parts Gafac RS-610. There are obtained 252 parts of an intense blue pigment with an alkali blue content of 76% which can be very easily dispersed into an ink to give the properties described in Table I.

EXAMPLE 21

The colors obtained from Examples 1 through 19 were dispersed in quickset lithographic full color inks by (1) premixing by hand, (2) giving a loose, non-grinding, mixing pass over a three-roll mill and (3) grinding on a three-roll mill with two tight passes; alternately, some of the colors were (1) premixed 20 minutes on a Cowles dissolver and then (2) given two tight passes over the three-roll mill, omitting the mixing pass. Strengths and grinds were then read. Strength is tinting strength vs. an ink made from a standard flushing at equal alkali blue content. NPIRI grinds are read on the NPIRI grind gauge as follows:

$a/b$-$c$ $a$ refers to the gauge reading where the third scratch which is at least 4 gauge divisions long or continues to the bottom of the gauge begins.

$b$ refers to the gauge reading where the tenth scratch which is at least 4 gauge divisions long or continuous to the bottom of the gauge begins.

$c$ refers to the particle field; the designation very light, light, moderate or heavy following this number refers to the density of the particle field.

This is a fairly standard method in use among inkmakers. A high quality ink should have no scratches and perhaps a light particle field below 2 or 3 (10 is worst reading, 0 is best). A lower quality ink may tolerate a low three scratch reading and a heavier particle field to 2 or 3 or perhaps a light field all the way to 10.

The National Printing Ink Research Institute (NPIRI) grind gauge is an instrument in common use among inkmakers for measuring the degree of dispersion of the pigments in an ink. It consists of a precisely machined metal block with two parallel 6 × ½ paths with depth varying from 0.001 inches at the top to 0 and graduated on a scale of 10 (deepest) to 0, together with a metal bar. A sample of the ink to be measured is placed at the top of each path and the bar pulled down tightly over the ink to the bottom of the paths. Hard pigment particles ae caught by the bar and pulled down with it, leaving behind a scratch in the ink paths. Softer particles, particularly irregularly shaped ones, tend to slip under the blade and appear as speckles. The point at which the scratches or speckles begin, thus gives an indication of the size of the largest particles present, while their number gives a relative indication of how many are present at any given particle size.

TABLE I

| Ex. | Strength | Grind-1 tight pass | Grind-2 tight passes |
|---|---|---|---|
| 1 | −2% | 0/0 — 10 light | 0/0 — 0 |
| 2 | −5% | 0/0 — 10 light | 0/0 — 4 very light |
| 3 | +9% | 1/0 — 10 light | 1/0 — 2 light |
| 4 | +7% | 2/0 — 10 moderate | 0/0 — 3 light |
| 5 | +4% | 3/0 — 10 moderate | 1/0 — 2 light |
| 6 | −5% | 2.5/0 — 10 light | 0/0 — 3 light |
| 7 | −17% | 0/0 — 3 heavy, 10 lt. | 0/0 — 3 light |
| 8 | −1% | 0/0 — 10 moderate | 0/0 — 2 very light |
| 9 | −5% | 3/0 — 10 heavy | 0/0 — 5 heavy |
| 10 | +5% | — | 2/0 — 3 light |
| 11 | equal | — | 3/0 — 4 light |
| 12 | +5% | — | 0/0 — 1 |
| 13 | +2% | 5/0 — 10 heavy | 2/0 — 3 light |
| 14 | equal | 0/0 — 5 heavy | 3/0 — 3 very light |
| 15 | +2% | — | 0/0 — 10 light |
| 16 | +3% | — | 3.5/2 — 10 heavy |
| 17 | −5% | 0/0 — 3 light | 0/0 — 0 |
| 18-A | −2% | 0/0 — 10 light | 0/0 — 0 |
| 18-B | −10% | 10/10 — 10 heavy | 0/0 — 10 heavy |
| 19 | +10% | 1/0 — 10 heavy | 3.5/0 — 4 very light |
| 20 | +4% | 2/0 — 10 moderate | 0/0 — 1 light |
| Raven 35 Carbon Black | — | 4/1 — 8 heavy | 3/0 — 4 light |

Having thus described the invention and illustrated the best modes presently known for its reduction to practice, what we claim is:

1. A substantially anhydrous, free-flowing alkali blue pigmentary composition, the pigmentary particles thereof coprecipitated with at least one aqueous alkaline soluble organic dispersant of the anionic class, said coprecipitated dispersant containing at least eight carbon atoms and insoluble in water, said coprecipitated pigmentary particles and dispersant combination further admixed with a water-insoluble organic hydrophobic oil phase of a quantity sufficient to substantially reduce hydrophilic aggregation of said coprecipitate during drying by water removal.

2. The product of claim 1 wherein the coprecipitated organic anionic dispersants constitute between about 5% and about 20% by weight of the alkali blue pigmentary composition.

3. The product of claim 1 wherein the water insoluble hydrophobic oil phase constitutes from 2% to 45% by weight of the alkali blue pigmentary composition.

4. The product of claim 1 wherein the alkali blue pigment solids are at least 50% by weight, the precipitated organic dispersants constitute between about 5% and about 20% by weight, and the hydrophobic oil phase is from about 2% to about 45% by weight of the said pigmentary composition.

5. The product of claim 1 wherein the organic dispersants comprise water-insoluble soap acids selected from the group consisting of rosin, hydrogenated rosin, vegetable oil fatty acids and sulfated vegetable oils.

6. The product of claim 4 wherein the organic dispersants comprise tall oil fatty acids.

7. The product of claim 4 wherein the organic dispersants comprise rosin fatty acids.

8. The product of claim 4 wherein the organic dispersant comprises a sulfated vegetable oil in the acid form.

9. The product of claim 8 wherein the sulfated vegetable oil in acid form is turkey red oil.

10. The product of claim 1 wherein the organic dispersant comprises the polyoxyethylene alcohol ester of phosphoric acids (known in the art as Gafac).

11. The product of claim 1 wherein at least one organic dispersant therein comprises N-substituted amino acids (known in the art as Armeen Z).

12. The product of claim 9 wherein a second dispersant present with said soap acids is a polyoxyethylene alcohol ester of phosphoric acid.

13. The product of claim 11 wherein the organic dispersants consist essentially of rosin acids and the polyoxyethylene alcohol esters of phosphoric acids.

14. The composition of claim 1 wherein the alkali blue pigment solids constitutes from 50% to 90% by weight of the total final product.

15. The method of production of an easy dispersing, dry, free-flowing alkali blue pigmentary composition of at least about 50% pigment solids which comprises adding at least one watersoluble organic dispersant of the anionic class to an aqueous alkaline solution of said pigment the organic moiety of which dispersant precipitates out of solution upon acidification, coprecipitating said alkali blue pigment and said dispersant by acidification, heat treating the coprecipitate before drying at a temperature of from about 60° C to about 120° C for a time, but less than 60 minutes at a temperature above 100° C; subsequent to said coprecipitation adding to said water-wetted mass and admixing therein a quantity but not in excess of about 45% by weight of the pigmentary product of a water-insoluble organic hydrophobic oil phase and drying and recovering said pigmentary product in a substantially water-free state.

16. The method of claim 15 wherein the organic anionic dispersant is between about 5% and about 20% by weight of the alkali blue pigmentary composition.

17. The method of claim 15 wherein the alkali blue pigment solids are at least 50% by weight, the precipitated organic dispersant comprises from about 5% to 20% by weight and the hydrophobic oil phase is from about 2% to about 45% by weight of the final substantially water-free pigmentary composition.

* * * * *

UNITED STATES PATENT AND TRADEMARK OFFICE
CERTIFICATE OF CORRECTION

PATENT NO. : 4,032,357
DATED : June 28, 1977
INVENTOR(S) : Thomas C. Rees and Robert J. Flores It is certified that error appears in the above—identified patent and that said Letters Patent is hereby corrected as shown below:

At column 1, line 33, after "phenyl", add -- , and $Y_2$ and $Y_3$ are not present when $R_1$ and $R_2$ respectively are hydrogen -- .

At column 1, line 37, delete "phenyl" and substitute therefor -- alkyl groups of 1 to 4 carbons -- .

Signed and Sealed this

Twenty-third Day of August, 1988

Attest:

DONALD J. QUIGG

*Attesting Officer*      *Commissioner of Patents and Trademarks*